United States Patent Office 3,639,609
Patented Feb. 1, 1972

3,639,609
DRUG OF ADRENO-BLOCKING ACTION
Sergei Sergeevich Krylov, Ul. Zamshinu 54, kv. 8;
Nadezhda Timofeevna Starykh, Ul. Bolshaya Porokhovskaya 54, korpus 2, kv. 80; Alexandr Grigorievich Chigarev, Ul. Blagodatnaya 53, kv. 21; and Andrei Vasilievich Eltsov, Pos. Pesochnoe 2, ul. Leningradskaya 70/I, kv. 51, all of Leningrad, U.S.S.R.
No Drawing. Filed July 31, 1969, Ser. No. 846,597
Int. Cl. A61k 27/00
U.S. Cl. 424—274
4 Claims

ABSTRACT OF THE DISCLOSURE

A drug of adreno-blocking action is proposed, containing as active principle ω-($3^1$-phenylpyrrolidyl-$1^1$)-6-propionylbenzo-1,4-dioxan hydrochloride of the formula

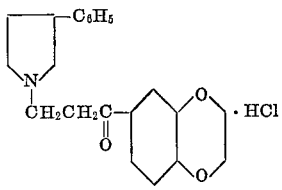

A process for the production of the active principle ω-($3^1$-phenylpyrrolidyl-$1^1$)-6-propionylbenzo-1,4-dioxan hydrochloride comprises reacting 3-phenylpyrrolidene with 6-acetylbenzo-1,4-dioxan and paraform in the molar ratio of 1:1:2.6 in the presence of hydrogen chloride in alcoholic solution at a temperature of 60–120° C., removing the unreacted 6-acetylbenzo-1,4-dioxan, alkalizing the reaction mixture, extracting with ether the ($3^1$-phenylpyrrolidyl - $1^1$) - 6-propionylbenzo-1,4-dioxan base formed, isolating the base and recrystallizing from ethyl ether, then dissolving in acetone and reacting with hydrogen chloride and isolating and purifying the final product by recrystallizing from ethanol acidified with hydrogen chloride.

The present invention realtes to a new drug of adreno-blocking action and a process for the production of the active principle of said drug, viz. ω-($3^1$-phenylpyrrolidyl-$1^1$)-6-propionylbenzo-1,4-dioxane hydrochloride.

According to the invention the present drug which we have tentatively named Pyrroxan contains as active principle ω-($3^1$ - phenylpyrrolidyl - $1^1$)-6-propionylbenzo-1,4-dioxane hydrochloride of the formula

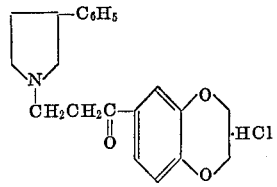

Pyrroxan is a strong adreno-blocking agent, having a clocking action predominantly on the alpha-adrenoreceptors.

Pyrroxan is an effective drug in diseases and conditions arising from a pathological heightening of the sympathetic tone of the nervous system, principally the central nervous system. It also has a pronounced sedative effect and, moreover, completely suppresses the central action (tremor) of nicotine.

Pyrroxan is employed in diverse diseases and pathological conditions which is explained by its basic property, i.e. its adreno-blocking action, and its ability to normalize pathological stimulation of the posterior hypothalamus.

The principle indication for the use of Pyrroxan is for the abortion, prevention and treatment of diencephalic and hypertonic crises of sympathicotonic character. In such cases the therapeutic effect sets in within 30–40 minutes, and consequently the drug can be used in emergency cases.

The drug has a marked therapeutic effect in mixed diencephalic crises (diencephalitis with diencephalic epilepsy, hyperkinesis of postencephalitic nature, etc), proceeding with predominance of sympathetic tone.

Pyrroxan has a pronounced therepeutice effect in preparing patients with hypertension of hormonal origin for surgical intervention on account of tumours and when treating a hypertensive syndrome making difficult hormonotherapy of recurrences and metastases of breast cancer.

Pyrroxan is successfully used for aborting opium (morphine or codein) abstinence symptoms. It is particularly effective in mitigating the most distressing symptoms (craving for the narcotic and insomnia) and facilitates the treatment of such patients in hospital. For aborting abstinence symptoms, Pyrroxan is administered in the ordinary dosage during the first week following the withdrawal of narcotics.

Pyrroxan is also indicated in the treatment of mental diseases proceeding with an anxiety-depression syndrome. In such cases Pyrroxan is used in the initial stage of treatment since it has a rapid therapeutic effect. This effect, however, is often not lasting, which necessitates going over to the use of antidepressants.

On the basis of individual clinical observations the use of Pyrroxan in the ordinary dosage can be considered indicated in Méniére's syndrome and hyperstimulation of the vestibular apparatus of diverse aetiology (after the operation of fenstration, and in various forms of motion sickness—seasickness, air sickness, etc.). In the latter conditions Pyrroxan can be administered in conjunction with drugs of other pharmacological groups, specifically cholinolytic and antihistamine drugs.

On the healthy person Pyrroxan has a slight sedative effect with no perceptible lowering of the normal blood pressure.

According to the invention the present drug contains the active principle in combination with a pharmaceutical filler for tablets and a solvent for injection solutions.

A 0.01 N aqueous solution of hydrochloric acid is used as solvent for injection solutions. Solutions for injection preferably contains 1–1.5 wt. percent of the active principle.

Pyrroxan has been tested in clinics on 317 patients. The drug was used for aborting, preventing and treating diencephalic and hypertonic crises of sympathicotonic character.

When the drug was administered intramuscularly (15–30 mg. of Pyrroxan) the patient's condition was mitigated in 5–15 min. and the crisis was completely aborted in 30–50 min. the blood pressure was normalized, tachycardia and pain in the region of the heat and epigastrium ceased and symptoms of fright passed away.

Administration of Pyrroxan in mixed diencephalic crises (diencephalitis nature, etc.) proceeding with a predominance of sympathetic tone, overcame diencephalic crises, normalized the blood pressure, and abolished seizures; patients felt considerably better subjectively, and sleep and appetite were normalized.

When the drug was used in preparing hypertonic patients for surgical intervention on account of tumours and in treating a hypertensive syndrome making difficult hormonotherapy of recurrences and metastases of breast cancer a good therapeutic effect was achieved in 2–4 days. A substantial hypotensive effect was observed, the patient's general condition improved and giddiness, headache and nausea disappeared. Pyrroxan was administered orally in doses of 10–20 mg. three times a day for a period of 1 week to 1 month.

For aborting the opium abstinence syndrome, Pyrroxan was administered intramuscularly in a dose of 30 mg. or orally in a dose of 60 mg. A therapeutic effect was noted in 10–15 min. when the drug was injected and in 30–40 min. when given orally: vomitting, shivering and sneezing ceased, and coryza, lacrimation, muscular pain, a craving for the narcotic and insomnia disappeared. A subjective feeling of satisfaction appeared and the back-ground of depression and the mood were normalized.

Pyrroxan was most effective in prolonged states of depression with a monotonous course. In pronounced melancholy Pyrroxan effectively abolished the feeling of dejection, heaviness in the chest, difficulty in breathing, etc. In anxiety-depression states Pyrroxan temporarily abated anxiety.

The drug is administered orally in tablets or powders and injected subcutaneously or intramuscularly in 0.01 N hydrochloric acid.

Recommended doses: orally, 0.015–0.032 g. 1–4 times a day; injections, 1–3 ml. of 1% solution 1–3 times daily or 1–2 ml. of 1.5% solution once or twice daily.

In diencephalic and hypertonic crises the best effect is obtained with intramuscular administration of 1–2 ml. of 1.5% solution once or twice daily. A therapeutic effect is usually noted after a single injection.

In essential hypertension I and II stages, A and B, the drug is prescribed orally for 10–15 days in a dosage of 0.01–0.015 g. 3–4 times a day or 0.02–0.03 g. 2–3 times a day, or subcutaneously or intramuscularly in doses of 1–2 ml. of 1–1.5% solution.

In cases of abstinence symptoms (withdrawal of opium, morphine, codeine, etc.) and in some forms of depression Pyrroxan is prescribed intramuscularly in a dose of 30 mg. or orally in single doses up to 60 mg., the daily dose being 90 or 180 mg. respectively, while checking the arterial pressure the first 3–6 days of treatment.

Treatment with Pyrroxan is possible in both in-patient and out-patient conditions.

It is advisable for the first administration of the drug to be made under the observation of a physician and to begin with a single dose of 10 mg., gradually increasing the dose for 2–3 days until the most effective is reached, that is, 30–40 mg. orally or intramuscularly.

Maximum single doses for adults: orally, 60 mg.; injections, 45 mg. Maximum daily doses: orally, 180 mg.; injections, 90 mg.

The drug has no side effects, and there are no absolute contraindications for its use. The use of Pyrroxan is not advisable in serious forms of atherosclerosis with pronounced stenocardia, in disorders of the cerebral circulation and pronouced cardiac insufficiency.

The present invention also embraces a process for the production of the active principle of the foregoing drug, viz, ω - ($3^1$-phenylpyrrolidyl-$1^1$)-6-propionylbenzo-1,4-dioxan hydrochloride.

A process for the production of ω-($3^1$-phenylpyrrolidyl-$1^1$)-6-propionylbenzo-1,4-dioxan hydrochloride is known which comprises reacting 3-phenylpyrrolidene with 6-acetylbenzo-1,4-dioxan and paraform in the presence of hydrogen chloride in alcoholic solution at the boiling point of alcohol. The unreacted 6-acetylbenzo-1,4-dioxan is then removed from the reaction mixture by extracting with ether. The reaction mixture is alkalized with potassium carbonate and the ω-($3^1$-phenylpyrrolidyl)-$1^1$)-6-propionylbenzo1,4-dioxan base formed is extracted with ethyl ether, the ether extract acidified to acid reaction with an alcoholic solution of hydrogen chloride, the precipitate of the final product filtered out and crystallized from acetone. The yield is 40–45%. The final product assays not less than 98%.

Disadvantages of said known process are the low yield of final product and the presence of impurities in the same which causes turbidity of aqueous solutions, making impossible its use in medical practice for parenteral administration.

It is an object of the present invention to increase the yield of final product and to obtain a final product of high quality fit for use in medical practice for parenteral administration.

It has been found that this object is achieved by the provision of a process for the production of ω-($3^1$-phynylpyrrolidyl-$1^1$)-6-propionylbenzo-1,4-dioxan hydrochloride involving the reaction of 3-phenylpyrrolidene, 6-acetylbenzo-1,4-dioxan and paraform in the presence of hydrogen chloride in alcoholic solution at a temperature of 60–120° C., removal of the unreacted 6-acetylbenzo-1,4-dioxan, alkalization of the reaction mixture, extraction with ether of the ω-($3^1$-phenylpyrrolidyl-$1^1$)-6-propionylbenzo-1,4-dioxan base formed, reaction of said base with hydrogen chloride followed by isolation and purification of the final product, wherein, according to the invention, the starting products 3-phenylpyrrolidene, 6-acetylbenzo-1,4-dioxan and paraform are taken in the molar ratio of 1:1:2.6, the base formed is isolated and recrystallized from ethyl ether and the final product purified by recrystallization from ethanol acidified with hydrogen chloride.

The present process is carried out as disclosed hereinbelow.

3-phenylpyrrolidene is dissolved in alcohol and acidified with an alcoholic solution of hydrogen chloride. 6-acetylbenzo-1,4-dioxan and paraform are added and the mixture boiled at a temperature of 60–120° C. The alcohol is distilled off and the residue diluted with water. The unreacted 6-acetylbenzo-1,4-dioxan is then extracted from the reaction mixture with ethyl ether and regenerated. The reaction mixture is alkalized and the ω-($3^1$-phenylpyrrolidyl-$1^1$)-6-propionylbenzo-1,4-dioxan base formed is extracted with ether, the ether extract dried over calcined magnesium or sodium sulphate, the solvent distilled off and the residue recrystallized from ethyl ether. A crystalline product is obtained; M.P. 64–66° C. The base is dissolved in acetone and to the solution there is added with stirring and cooling to 0 to +5° C. an alcoholic solution of hydrogen chloride to pH 5. The precipitate of the final product which forms is filtered out, dried at 50–60° C. and recrystallized from ethanol acidified with hydrogen chloride. The yield of final product is 50–60%. The final product assays not less than 99%; M.P. 137–142° C. (within a range of 2° C.).

The present process yields a final product of higher quality than the previously known process (the product obtained by the present process assays not less than 99%, while the product obtained by the known process assays not less than 98%). Moreover the yield of final product is increased.

The process of the present invention is illustrated in the following example.

EXAMPLE 15.5 g. (0.105 g.-mol) of 3-phenylpyrrolidene is dissolved in 60 ml. of absolute ethyl alcohol and acidified to acid reaction (pH 3) with 25% alcoholic hydrogen chloride. 18.4 g. (0.105 g.-mol) of 6-acetylbenzo-1,4-dioxan and 8 g. (0.27 g.-mol) of paraform are added and the mixture refluxed at 78–80° C. for 6 hrs. The alcohol is distilled off and the residue poured from the flask into 500 ml. of water. The unreacted 6-acetylbenzo-1,4-dioxan is extracted from the water layer with ether (3 times with 50 ml. portions) and regenerated. The aqueous layer is alkalized with 50 ml. of 10% sodium hydroxide and the base extracted with three 75 ml. portions of ether. The combined organic extract is dried over calcined magnesium sulphate, the solvent distilled off and the residue recrystallized from ether. 21.2 g. of base are obtained in the form of a white or slightly cream-coloured crystalline substance. 21.2 g. of the base are dissolved in 150 ml. of acetone, the solution filtered, and 25% alcoholic hydrogen chloride added with stirring and cooling to 0 to +5° C.

to pH 5. After stirring for 1 hr. the precipitate is filtered out, washed with acetone, dried at 60° C. and recrystallized from 75 ml. of ethanol acidified with 0.5 ml. of 25% alcoholic hydrogen chloride. There is obtained 19 g. (51% yield) of ω-(3¹-phenylpyrrolidyl-1¹)-6-propionylbenzo-1,4-dioxan hydrochloride in the form of a white or slightly yellow crystalline substance; M.P. 139–141° C.

What is claimed is:

1. A composition having adreno-blocking activity and comprising as the active principle thereof, a therapeutically effective amount of ω-(3¹-phenylpyrrolidyl-1¹)-6-propionylbenzo-1,4-dioxan hydrochloride having the formula

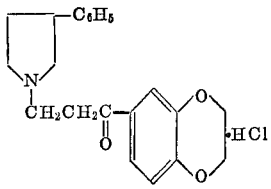

and a carrier therefor.

2. The composition as claimed in claim 1 wherein the carrier is a solvent for injection solutions.

3. The composition as claimed in claim 2, wherein 0.01 N aqueous hydrochloric acid is the solvent for injection solutions.

4. The composition as claimed in claim 3, wherein the injection solutions contain from 1 to 1.5 wt. percent of the active principle.

References Cited
UNITED STATES PATENTS 3,312,592   4/1967   Chodnekar et al. __ 260—326.5 D STANLEY J. FRIEDMAN, Primary Examiner U.S. Cl. X.R.

260—326.5 D